(12) United States Patent
Zhai et al.

(10) Patent No.: US 11,817,714 B2
(45) Date of Patent: Nov. 14, 2023

(54) HIGH-TEMPERATURE SUPERCONDUCTING SUSPENSION TYPE WIRELESS POWER TRANSMISSION DEVICE AND ASSEMBLY METHOD THEREOF

(71) Applicant: Hunan University, Changsha (CN)

(72) Inventors: Yujia Zhai, Changsha (CN); Tingkun Weng, Changsha (CN); Chang Niu, Changsha (CN); Xinyi Liu, Changsha (CN); Chunran Mu, Changsha (CN); Yunxiang Dai, Changsha (CN); Hao Liu, Changsha (CN); Zhuo Li, Changsha (CN); Xiaofei Zhang, Changsha (CN); Jian Gao, Changsha (CN); Sheng Huang, Changsha (CN); Shoudao Huang, Changsha (CN)

(73) Assignee: Hunan University, Changsha (CN)

( * ) Notice: Subject to any disclaimer, the term of this patent is extended or adjusted under 35 U.S.C. 154(b) by 0 days.

(21) Appl. No.: 17/820,761

(22) Filed: Aug. 18, 2022

(65) Prior Publication Data
US 2023/0208190 A1    Jun. 29, 2023

(30) Foreign Application Priority Data
Dec. 29, 2021   (CN) .......................... 202111641285.3

(51) Int. Cl.
| | |
|---|---|
| *H02J 50/00* | (2016.01) |
| *H01F 6/06* | (2006.01) |
| *H02J 50/12* | (2016.01) |

(52) U.S. Cl.
CPC .............. *H02J 50/005* (2020.01); *H01F 6/06* (2013.01); *H02J 50/12* (2016.02)

(58) Field of Classification Search
None
See application file for complete search history.

(56) References Cited

U.S. PATENT DOCUMENTS

| | | | | |
|---|---|---|---|---|
| 5,628,252 | A * | 5/1997 | Kuznetsov | .............. B60L 13/10 104/284 |
| 6,418,857 | B1 * | 7/2002 | Okano | .................... B60L 13/04 104/284 |

(Continued)

*Primary Examiner* — Daniel Kessie
(74) *Attorney, Agent, or Firm* — NIELDS, LEMACK & FRAME, LLC

(57) ABSTRACT

Disclosed are a high-temperature superconducting suspension type wireless power transmission device and an assembly method thereof. The device comprises an alternating current power supply, wherein the alternating current power supply is electrically connected with a transmitting coil, and the transmitting coil is made of high-temperature superconducting materials; a suspended matter is mounted above the transmitting coil, the suspended matter is electrically connected with a receiving coil corresponding to the transmitting coil, and a plurality of permanent magnets fixedly connected with the suspended matter are uniformly mounted along the periphery of the receiving coil; and the transmitting coil is located in a low-temperature container to maintain a superconducting state. In combination with the superconducting magnetic suspension technology and the superconducting wireless charging technology, power is stored without the need of a complex energy storage device.

2 Claims, 1 Drawing Sheet

(56) References Cited

U.S. PATENT DOCUMENTS

| | | | |
|---|---|---|---|
| 2011/0100251 A1* | 5/2011 | Zheng | B61B 13/08 |
| | | | 104/284 |
| 2011/0259236 A1* | 10/2011 | Kwon | B61B 13/10 |
| | | | 701/19 |
| 2016/0192094 A1* | 6/2016 | Liu | H04R 27/00 |
| | | | 381/82 |
| 2016/0226313 A1* | 8/2016 | Okubo | B60L 53/126 |
| 2016/0276914 A1* | 9/2016 | Peroulis | H02K 7/1876 |
| 2017/0063194 A1* | 3/2017 | Puskarich | H02K 11/215 |
| 2017/0172009 A1* | 6/2017 | Wang | G06F 1/1632 |
| 2017/0331328 A1* | 11/2017 | Yang | H04B 5/0037 |
| 2018/0241223 A1* | 8/2018 | Bae | H04B 5/0081 |
| 2019/0348898 A1* | 11/2019 | Frangen | B65G 54/02 |
| 2020/0184101 A1* | 6/2020 | Kim | G06F 21/606 |
| 2020/0194154 A1* | 6/2020 | Markiewicz | H01F 6/02 |
| 2020/0324971 A1* | 10/2020 | Ingram-Tedd | B65G 1/04 |

\* cited by examiner

HIGH-TEMPERATURE SUPERCONDUCTING SUSPENSION TYPE WIRELESS POWER TRANSMISSION DEVICE AND ASSEMBLY METHOD THEREOF

CROSS REFERENCE TO RELATED APPLICATION

This patent application claims the benefit and priority of Chinese Patent Application No. 202111641285.3, filed on Dec. 29, 2021, the disclosure of which is incorporated by reference herein in its entirety as part of the present application.

TECHNICAL FIELD

The present disclosure relates to the field of electrical engineering, in particular to a high-temperature superconducting suspension type wireless power transmission device.

BACKGROUND ART

The wireless power transmission technology is continuously researched and developed due to the advantages of convenience, high safety performance and the like after being proposed at the end of the 19th century. According to the power transmission mode, an artificial conductor is not needed between a power supply and a conductor, so that the problems that a traditional limited power transmission mode is subjected to cable constraints and inevitable line aging, point discharge and the like is solved, and the power transmission mode is widely applied to the fields of intelligent household appliances, biomedical treatment and the like. In 2007, researchers of the Massachusetts University of Technology propose that power is transmitted through a resonance principle, the transmission distance and the transmission power are greatly improved, and good transmission characteristics are obtained in all aspects.

Compared with a wired charging mode, the wireless charging mode can overcome the problems of wire invasion, wire stumbling, aging and electric leakage and the like. Moreover, the occupied area is reduced, charging places and charging time can be relatively scattered, and the impact of charging on a power grid is reduced. The wireless charging technology can also play roles of peak clipping and valley filling, energy storage and energy discharge can be carried out anytime and anywhere according to the requirement of power grid intelligent dispatching, so that the stability of the power grid is improved.

The wireless power transmission technology always has the conditions of low transmission efficiency and short transmission distance, so that the application of wireless power transmission is greatly limited. Therefore, scientists all around the world optimize wireless power transmission systems in various modes. The high-temperature superconductor has incomparable advantages in various fields of nuclear fusion devices, motor manufacturing, superconducting electromagnetic propulsion systems and the like due to the characteristics of zero resistance effect at low temperature, low loss, high current-carrying density and the like. The efficiency of the wireless transmission system mainly depends on the resistive loss of the transmitting coil and the receiving coil, and the alternating current loss of the high-temperature superconductor is much lower than that of conventional conductors. The high-temperature superconductor is applied to wireless power transmission to improve the transmission efficiency, and has obvious advantages.

At present, at the exhibition, a suspension device is sometimes used for suspension exhibition of exhibits. In the existing suspension exhibition, products are generally suspended through electromagnetic suspension and the like. However, electromagnetic suspension generally needs a C-shaped magnetic structure, so that the products are located in the middle of the C-shaped structure to be stably suspended. At the same time, internal batteries are usually required to provide power for operation or luminescence of exhibits, so that the whole device is complex, and continuous and uninterrupted display is difficult.

SUMMARY

In order to solve the problem, the present disclosure provides a high-temperature superconducting suspension type wireless power transmission device. According to the device, just the transmitting side is made of superconducting materials. Meanwhile, in combination with the superconducting magnetic suspension technology and the superconducting wireless charging technology, power is stored without the need of a complex energy storage device. Meanwhile, the device supplies power to a static system, application scenes are greatly different, and the device has a quite special propaganda effect on exhibition devices, propaganda display racks and the like. In addition, a wireless power transmission system is designed, the transmitting side is made of superconducting materials, and impedance matching is carried out, so that the coil is kept in a resonant state, and the effects of improving the efficiency and increasing the transmission distance are achieved.

To achieve the above objective, the present disclosure has the following technical schemes.

A high-temperature superconducting suspension type wireless power transmission device comprises an alternating current power supply 1, wherein the alternating current power supply 1 is electrically connected with a transmitting coil $L1$, and the transmitting coil $L1$ is made of high-temperature superconducting materials; a suspended matter 2 is mounted above the transmitting coil $L1$, the suspended matter 2 is electrically connected with a receiving coil $L2$ corresponding to the transmitting coil $L1$, and a plurality of permanent magnets 3 fixedly connected with the suspended matter 2 are uniformly mounted along the periphery of the receiving coil $L2$; and the transmitting coil $L1$ is located in a low-temperature container 4 to maintain a superconducting state.

Through further improvement, the low-temperature container 4 is a container with which liquid nitrogen is filled.

Through further improvement, the suspended matter 2 comprises a luminous globe and a luminous exhibition stand.

Through further improvement, the alternating current power supply 1 is electrically connected with the transmitting coil $L1$ through a first compensation capacitor $C1$, the transmitting coil $L1$ is electrically connected with a first resistor $R1$, and the first resistor $R1$ is electrically connected with the alternating current power supply 1 to form a first LC series resonance network.

Through further improvement, the receiving coil $L2$ is electrically connected with the suspended matter 2 through a second compensation capacitor $C2$, the suspended matter 2 is electrically connected with a second resistor $R2$, and the second resistor $R2$ is electrically connected with the receiving coil $L2$ to form a second LC series resonance network.

Through further improvement, the receiving coil $L2$ is a copper coil.

Through further improvement, the transmitting coil L1 is made of YBCO superconducting tape wound low-temperature-resistant epoxy resin; the inner diameter of the transmitting coil L1 is 25 cm, the number of turns is ten, and the critical current is 124 A; and the size and the number of turns of the receiving coil L2 are the same as those of the transmitting coil L1.

Through further improvement, the permanent magnet 3 is a strip-shaped permanent magnet, and a magnetism gathering iron clamp is arranged between the permanent magnets 3, so that the magnetic field is not uniform in space and is freely dispersed.

An assembly method of the high-temperature superconducting suspension type wireless power transmission device comprises the following steps:

step one, designing a transmitting end circuit; the transmitting end circuit comprises an alternating current power supply 1, the alternating current power supply 1 is electrically connected with a transmitting coil C1 through a first compensation capacitor L1, the transmitting coil L1 is electrically connected with a first resistor R1, and the first resistor R1 is electrically connected with the alternating current power supply 1 to form a first LC series resonance network; the transmitting coil L1 is made of a high-temperature superconducting material;

step two, designing a receiving end circuit; the receiving end circuit comprises a receiving coil L2, the receiving coil L2 is electrically connected with a suspended matter 2 through a second compensation capacitor C2, the suspended matter 2 is electrically connected with a second resistor R2, and the second resistor R2 is electrically connected with the receiving coil L2 to form a second LC series resonance network; the receiving coil L2 is formed by winding a copper coil; the receiving coil L2 is fixed right below the suspended matter 2 and electrically connected with the suspended matter 2, and the receiving coil L2 is located right above the suspended matter 2; strip-shaped permanent magnets 3 are fixed to the bottom of the suspended matter 2 and uniformly distributed on the periphery of the receiving coil L2;

step three, relatively selecting the output frequency of the transmitting coil L1 and the values of the first compensation capacitor C1 and the second compensation capacitor C2 so that the circuit is maintained in a resonant state;

step four, according to a critical state Bean model, through the critical current density of the transmitting coil L1 and the total magnetic field intensity of the permanent magnets 3 at different positions, obtaining the levitation force of different positions right above the transmitting coil L1; calculating the number of the permanent magnets 3 needing to be fixed at the bottom of the suspended matter 2 according to the weight of the suspended matter 2 and the lowest height needing to be suspended; and step five, cooling the transmitting coil L1 under the condition of no magnetic field by using a zero-field cooling mode until the transmitting coil L1 reaches a superconducting state; placing the suspended matter 2 at a preset suspension height, and aligning the transmitting coil L1 and the receiving coil L2 to complete assembly;

when the high-temperature superconducting suspension type wireless power transmission device is used, the height of the suspended matter 2 is adjusted by adjusting the current size of the transmitting coil L1, and charging is performed at the same time.

Through further improvement, the high-temperature superconducting suspension type wireless power transmission device is located in a non-transparent box body with an opening in the top. The suspended matter 2 is located in the non-transparent box body when being located at the lowest height needing to be suspended. When the transmitting coil L1 is conducted through preset current for charging, the suspended matter 2 emerges out of the non-transparent box body; and the preset current has a plurality of gears. In this way, when display is needed, the transmitting coil L1 is powered on, the suspended matter 2 emits light to generate a lamp effect and suspends out of the non-transparent box body. The suspended matter 2 can gradually rise along with the increase of the electrification amount, the brightness is gradually enhanced, and therefore different effects are displayed according to needs.

The present disclosure has the following beneficial effects.

According to the device, just the transmitting side is made of superconducting materials. Meanwhile, in combination with the superconducting magnetic suspension technology and the superconducting wireless charging technology, power is stored without the need of a complex energy storage device. Meanwhile, the device supplies power to a static system, application scenes are greatly different, and the device has a quite special propaganda effect on exhibition devices, propaganda display racks and the like.

In addition, a wireless power transmission system is designed, the transmitting side is made of superconducting materials, and impedance matching is carried out, so that the coil is kept in a resonant state, and the effects of improving the efficiency and increasing the transmission distance are achieved.

DETAILED DESCRIPTION OF THE EMBODIMENTS

The technical schemes of the present disclosure are described in detail below through the specific embodiments and in conjunction with the attached figures.

Figure 1:
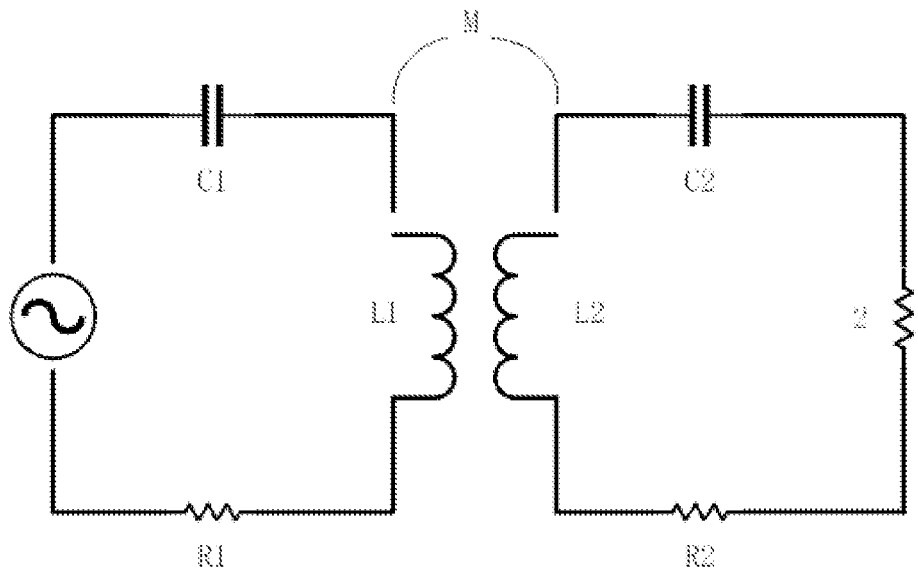
FIG. 1 is a schematic diagram of a circuit in the present disclosure.
Figure 2:
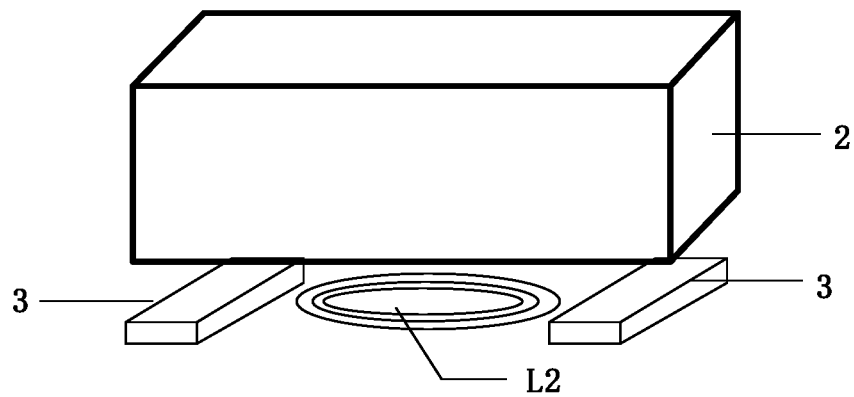
FIG. 2 is a structural schematic diagram of the present disclosure.
Figure 2:
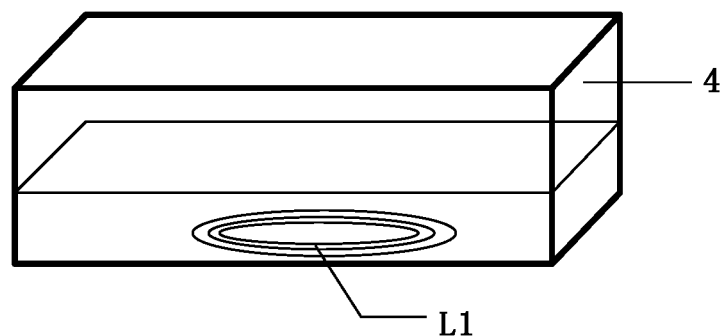

Disclosed is a high-temperature superconducting suspension type wireless power transmission device as shown in FIG. 1. The present disclosure adopts the following technical schemes.

Step one, designing a power transmission structural circuit of the power transmission device.

A suspension structural circuit, as shown in FIG. 1, comprises a transmitting end and a receiving end. The transmitting end and the receiving end are both LC series resonance networks. The transmitting end comprises an alternating current power supply, an LC resonance network and a transmitting coil L1. The receiving end comprises a receiving coil L2, an LC resonance network and a load.

The compensation characteristics of the network are analyzed. L1, R1 and C1 are inductance, internal resistance and series capacitance of the transmitting coil respectively. L2, R2 and C2 are inductance, internal resistance and series capacitance of the receiving coil respectively. M is mutual inductance.

The two circuits are subjected to Kirchhoff circuit analysis.

$$Uin=(R1+jwL1+1/jwC+jwMI2$$

$$U2=(jwMI1+(R2+jwL2+1/jwC2)I2)=-RLI2$$

Since the circuit operates in a resonant state, namely, the inductance and capacitance of each mesh resonate, $$jwL1+1/jwC1=0$$

$$jwL2+1/jwC2=0$$

the circuit in the resonant state may become:

$$Uin=R1I1+jwMI2$$

$$U2=(jwMI1+R2I2)=-RLI2$$

The equivalent impedance of the input loop is solved.

$$Z_{in} = R_1 + \frac{(\omega M)^2}{R_L + R_2}$$

The transmission efficiency is that:

$$\eta = \frac{(\omega M)^2 R_L}{(R_L + R_2)\left[R_1(R_L + R_2) + (\omega M)^2\right]}$$

Theoretical analysis indicates that the transmission efficiency of the wireless power transmission system depends on the resistance of the transmitting coil and the resistance of the receiving coil. The smaller the resistance efficiency is, the higher the wireless power transmission efficiency is. The resistance tends to zero, and the efficiency tends to 100%. When the superconducting coil is used as the transmitting coil, R1 is remarkably reduced, and the transmission efficiency is improved. Therefore, when the superconducting materials are applied to the wireless power transmission system, because of the performance advantage of low resistance, the transmission efficiency of the system can be improved, and the system performance is improved.

The transmission system needs larger output power, the output power and the transmission efficiency are improved by utilizing the superconducting coil, and the fixed superconducting end of the suspension structure already adopts superconducting materials and a cooling device, so that an additional cooling device does not need to be arranged. Therefore, the superconducting coil is arranged at the transmitting end, and a common copper coil is arranged at the receiving end. The superconducting-normally conducting structure facilitates to adjust the receiving coil. Meanwhile, impedance matching of the structure is relatively simple. In addition, the cooling device has been already arranged in the suspension structure, so that no additional devices need to be arranged. Therefore, the cost and the size of the device are saved to a greater extent.

Step two, designing a power transmission structure transmitting end (suspension structure fixed end) of the power transmission device.

In the step 201, through related background art and the first step, the transmitting end is of a superconducting structure, and the transmitting end is generally fixed in a place where the transmitting end needs to be placed in use. 1-5 KHZ of alternating current is output by using a high-frequency output power supply. The high-frequency output power supply is connected with the compensation capacitor and then is connected with the transmitting coil. The transmitting coil L1 is wound by a YBCO superconducting tape. The coil skeleton is made of low-temperature-resistant epoxy resin. The inner diameter of the transmitting coil L1 is 25 cm, and the number of turns is ten.

In the step 202, the high-temperature superconducting tape coil is subjected to zero-field cooling (zero-field cooling is used for enabling a suspension part to realize stable suspension) by using liquid nitrogen. The high-temperature superconducting tape coil is cooled for ten minutes to be fully cooled in a superconducting state completely, and is superconducting.

Through experiments, the suspension force of the selected superconducting coil under the condition of zero-field cooling is larger than that of field cooling. Besides, under the condition of zero-field cooling, the maximum suspension force has a direct relation with induced current density. The larger the induced current density is, the larger the suspension force obtained under zero-field cooling is. According to the critical state Bean model, the generated induced current can be approximately considered to be equal to the critical current density of the strip, so that in the model, the magnitude of the generated suspension force can be estimated in advance through the critical current density and the magnetic field intensity.

Step one, designing a power transmission structural receiving end of the power transmission device.

In the step 301, the common copper coil is arranged at the receiving end. The common copper coil is connected with the compensation capacitor and then is connected with the load (generally needed low-power generating devices such as a lighting device of an exhibition stand and the like). The receiving coil is formed by winding the common copper coil. The size and the number of turns of the receiving coil are consistent with those of the superconducting transmitting coil.

In the step 302, it should be noted that when the device is used for the first time, the output frequency and the value of the compensation capacitance need to be relatively selected, so that the circuit is kept in the resonant state, and the transmission efficiency is as high as possible.

In the step 303, the coil structure at the receiving end and the circuit are fixed below the suspension device.

Step four, designing a suspension end of the suspension structure.

In the step 101, long permanent magnet tracks are placed below the suspended matter. The long permanent magnet tracks and the suspended matter are firmly fixed, and the magnetism gathering iron clamp exists between the permanent magnets, so that the magnetic field is not uniform in space and is freely dispersed, and then the suspended matter is more stable.

In the step 202, it needs to be noted that in practical application, the number can be selected according to the actually needed weight and size of the suspended matter, and the required number of the permanent magnet track devices can be placed.

Because of the weight difference of carried display objects, in order to maintain the transmission efficiency of the device in a general range and ensure the stability of the power supply, the levitation distance (transmission distance) of the device is preferably controlled at 30-35 cm. A suitable power supply current is selected to control the levitation height after electrification:

| Extra change heights/cm | Alternating current power supply magnitudes/A |
| --- | --- |
| +1 | 3.1 |
| +1.3 | 3.5 |
| +1.6 | 3.9 |
| +2.0 | 4.4 |
| +2.4 | 4.9 |
| +2.8 | 5.4 |
| +3.3 | 6.0 |
| +3.8 | 6.6 |

2.3 Principles and Beneficial Effects of the Technical Schemes of the Present Disclosure In an external magnetic field, through the unique strong pinning capacity of the high-temperature superconductor, captured magnetic lines of force are difficult to escape from the constraint of the pinning center, and free magnetic lines of force that are not captured are also difficult to permeate into the superconductor. Through the unique pinning characteristic, the superconductor can induce superconducting strong current that impede changes in the external magnetic field with the changes. The electromagnetic interaction of the superconducting current and the external magnetic field macroscopically generates the suspension force balanced with the gravity of the suspension body and provides a guiding force required for lateral stabilization. Therefore, the suspended matter can be suspended even when not electrified. Moreover, the device does not shift due to collision when the device falls off after being not electrified.

Furthermore, the superconductor can show good superconductivity in a relatively cheap liquid nitrogen temperature area (77 K), so that a low-temperature refrigerating system is simplified.

Microscopically, structural defects such as dislocation and precipitates in the preparation process of the high-temperature superconductor material form potential energy potential wells. When a normal-state superconducting block material is put into the magnetic field, the magnetic field can penetrate through the block material. After the block material is cooled and enters a superconducting state, the potential energy potential wells prevent magnetic flux lines from moving and constrain the magnetic flux lines, causing a magnetic flux capture or pinning effect. The superconducting state high-temperature superconducting block material gradually gets close to the permanent magnets, and the external magnetic field enters the superconductor in the form of a magnetic flux sub-beam. The superconducting region around the pinning center (non-superconducting region) generates eddy current to firmly lock the magnetic flux sub-beam when meeting lattice defects or doping and the like (pinning center) on the path through which the superconducting block material passes. Therefore, a macroscopically emerging self-stabilization suspension phenomenon is formed.

Through zero-field cooling, before the high-temperature superconductor is in a normal state, the magnetic field is allowed to freely enter the interior of the superconductor. After the superconductor is cooled in a superconducting state, the magnetic field in the superconductor is restrained in the form of magnetic flux photons due to the existence of a plurality of pinning centers in the superconductor, namely, the magnetic flux is captured. Shielding current generated by induction in the superconductor after zero-field cooling ensures that the superconductor can realize stable suspension in the vertical direction, and capturing of magnetic flux ensures the lateral stability of the superconductor in the horizontal direction.

The novel device has the advantages that the zero resistance characteristic and the Meissner characteristic of the superconducting material are fully utilized, two application scenes which are widely applied are combined, and the high-temperature superconducting suspension type wireless power transmission device is constructed. The device can realize suspension type charging. Complex wire interference is avoided. Meanwhile, the suspension effect is achieved, and wide application prospects are achieved in any scene where power transmission and suspension are needed at the same time. The device can be used as a brightening project to be applied to various propaganda exhibitions, and has a lighting effect while suspending propaganda is carried out. In high-grade places, the device can massage suspended matters, charge mobile phones and the like, scan, swipe cards and the like. Suspended luminescence can be achieved in exhibition halls such as jewelry exhibitions, cultural relic exhibitions and archaeological exhibitions. Buddha statues, menstrual books and the like are displayed in religious temple ceremonies. The device is characteristic and takes effect, does not need extra occupied space, and can be applied in a plurality of spaces everywhere.

In addition, the device simultaneously applies two characteristics of the superconducting materials, and two functions can be realized by needing only one device. Meanwhile, two effects of suspension and power transmission can be achieved without increasing too much cost by needing only one cooling device. In a plurality of scenes needing suspension, the power transmission device can be considered to be added to supply power to corresponding loads, and new application is achieved.

The foregoing is only one specific guide embodiment of the present disclosure, but the inventive design concept is not limited thereto, and insubstantial modifications of the present disclosure using the concept should fall within the scope of protection of the present disclosure.

What is claimed is:

1. An assembly method of the high-temperature superconducting suspension type wireless power transmission device, comprising the following steps:

step one, designing a transmitting end circuit; the transmitting end circuit comprises an alternating current power supply, the alternating current power supply is electrically connected with a transmitting coil through a first compensation capacitor, the transmitting coil is electrically connected with a first resistor, and the first resistor is electrically connected with the alternating current power supply to form a first LC series resonance network; the transmitting coil is made of high-temperature superconducting materials;

step two, designing a receiving end circuit; the receiving end circuit comprises a receiving coil, the receiving coil is electrically connected with a suspended matter through a second compensation capacitor, the suspended matter is electrically connected with a second resistor, and the second resistor is electrically connected with the receiving coil to form a second LC series resonance network; the receiving coil is formed by winding a copper coil; the receiving coil is fixed right below the suspended matter and electrically connected with the suspended matter, and the receiving coil is located right above the suspended matter; strip-shaped permanent magnets are fixed to the bottom of the suspended matter and uniformly distributed on the periphery of the receiving coil;

step three, relatively selecting the output frequency of the transmitting coil and the values of the first compensation capacitor and the second compensation capacitor so that the circuit is maintained in a resonant state;

step four, according to a critical state Bean model, through the critical current density of the transmitting coil and the total magnetic field intensity of the permanent magnets at different positions, obtaining the levitation force of different positions right above the transmitting coil; calculating the number of the permanent magnets needing to be fixed at the bottom of the suspended matter according to the weight of the suspended matter and the lowest height needing to be suspended; and step five, cooling the transmitting coil under the condition of no magnetic field by using a zero-field cooling mode until the transmitting coil reaches a superconducting state;

placing the suspended matter at a preset suspension height, and aligning the transmitting coil and the receiving coil to complete assembly;

when the high-temperature superconducting suspension type wireless power transmission device is used, the height of the suspended matter is adjusted by adjusting the current size of the transmitting coil, and charging is performed at the same time.

2. The assembly method of the high-temperature superconducting suspension type wireless power transmission device according to claim 1, wherein the high-temperature superconducting suspension type wireless power transmission device is located in a non-transparent box body with an opening in the top, the suspended matter is located in the non-transparent box body when being located at the lowest height needing to be suspended, and when the transmitting coil is conducted through preset current for charging, the suspended matter emerges out of the non-transparent box body; and the preset current has a plurality of gears.

* * * * *